(12) United States Patent
Golde

(10) Patent No.: US 10,373,341 B2
(45) Date of Patent: Aug. 6, 2019

(54) SYSTEMS AND METHODS FOR AUTOMATED COLOR CORRECTION

(71) Applicant: Facebook, Inc., Menlo Park, CA (US)

(72) Inventor: Ittai M. Golde, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 151 days.

(21) Appl. No.: 15/688,006

(22) Filed: Aug. 28, 2017

(65) Prior Publication Data

US 2019/0066336 A1 Feb. 28, 2019

(51) Int. Cl.
*G06T 7/90* (2017.01)
*G06T 11/00* (2006.01)
*H04N 1/60* (2006.01)
*G06K 9/46* (2006.01)
*G06N 20/00* (2019.01)

(52) U.S. Cl.
CPC ............ *G06T 7/90* (2017.01); *G06K 9/4671* (2013.01); *G06N 20/00* (2019.01); *G06T 11/001* (2013.01); *H04N 1/6008* (2013.01); *G06T 2200/24* (2013.01); *G06T 2207/10024* (2013.01)

(58) Field of Classification Search
CPC .............. G06T 7/90; G06T 11/001; G06T 2207/10024; G06T 2200/24; G06N 20/00; G06K 9/4671; H04N 1/6008
See application file for complete search history.

(56) References Cited

U.S. PATENT DOCUMENTS 9,691,161 B1\* 6/2017 Yalniz ................. G06K 9/6201
2018/0027222 A1\* 1/2018 Ogasawara ............ G03B 15/00
348/175

\* cited by examiner

*Primary Examiner* — Phuoc Tran
(74) *Attorney, Agent, or Firm* — Sheppard Mullin Richter & Hampton LLP

(57) ABSTRACT

Systems, methods, and non-transitory computer-readable media can identify an object depicted in an image. True color information associated with the object is obtained from a true color database comprising true color information for a plurality of objects. A color delta associated with the object is determined based on the true color information and captured color information associated with the object. The image is modified based on the color delta.

20 Claims, 8 Drawing Sheets

SYSTEMS AND METHODS FOR AUTOMATED COLOR CORRECTION

FIELD OF THE INVENTION

The present technology relates to the field of content generation. More particularly, the present technology relates to systems and methods for digital image processing.

BACKGROUND

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system.

Users can be provided with tools to create and/or modify content. Users may wish to create content for a variety of reasons. For example, users of a social networking system can be provided with tools to create and/or modify content to share on the social networking system. In this example, user experience associated with the social networking system can be enhanced as the user is able to create and share interesting, high quality content. User experience associated with the social networking system can also be enhanced as the user is able to view interesting, high quality content created and shared by other users of the social networking system.

SUMMARY

Various embodiments of the present disclosure can include systems, methods, and non-transitory computer readable media configured to identify an object depicted in an image. True color information associated with the object is obtained from a true color database comprising true color information for a plurality of objects. A color delta associated with the object is determined based on the true color information and captured color information associated with the object. The image is modified based on the color delta.

In an embodiment, the identifying the object depicted in the image is performed automatically based on one or more machine learning models.

In an embodiment, the true color information comprises a true color RGB value, and the captured color information comprises a captured color RGB value.

In an embodiment, the color delta comprises a difference of the true color RGB value and the captured color RGB value.

In an embodiment, the modifying the image based on the color delta comprises applying the color delta to each pixel in the image.

In an embodiment, the true color information associated with the object comprises a plurality of RGB values, and the plurality of RGB values are indicative of the object containing a plurality of colors.

In an embodiment, the captured color information associated with the object comprises an average of a plurality of pixel RGB values for a plurality of pixels associated with the object.

In an embodiment, the identifying the object depicted in the image is performed based on user identification of one or more objects in the image.

In an embodiment, a second object depicted in the image is identified. It is determined that the second object is not associated with true color information in the true color database.

In an embodiment, a second object depicted in the image is identified. True color information associated with the second object is obtained from the true color database. A second color delta associated with the second object is calculated based on the true color information associated with the second object and captured color information associated with the second object. The image is modified based on the color delta and the second color delta.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
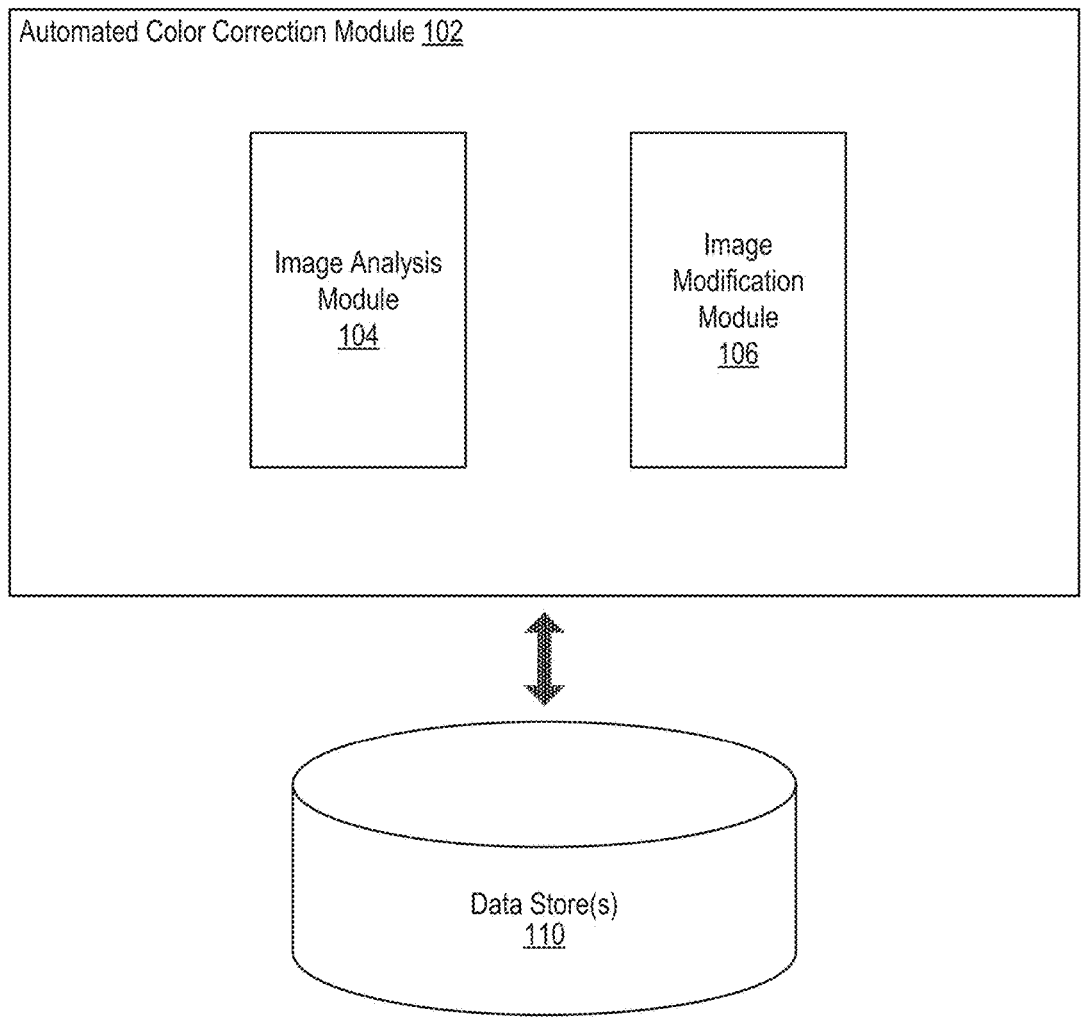
FIG. 1 illustrates an example system including an automated color correction module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Automated Color Correction of Digital Images

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system.

Users can be provided with tools to create and/or modify content. Users may wish to create content for a variety of reasons. For example, users of a social networking system can be provided with tools to create and/or modify content to share on the social networking system. In this example scenario, user experience associated with the social networking system can be enhanced as the user is able to create and share interesting, high quality content. User experience associated with the social networking system can also be enhanced as the user is able to view interesting, high quality content created and shared by other users of the social networking system.

Improvements in digital imaging hardware and software have allowed users to take and share digital images more easily than ever before. However, despite improved hardware and software tools, users continue to experience problems that lead to digital images of poor quality. For example, users often find that digital images do not accurately portray the colors of objects in images. This can be caused, for example, by different types of lighting and different ways in which digital imaging products (e.g., cameras) process a captured image. A procedure known as "white balancing" allows users to correct image colors using post-processing tools. However, many white-balancing tools require manual input as to how to correct an image's colors, for example, by modifying a tint and/or a temperature setting. This requires some know-how and expertise, as well as user effort and time, which many users may not wish to expend. Such expenditures can be particularly burdensome given that users may take hundreds or thousands of digital images in a short period of time.

Conventional approaches may also utilize a "gray card." A gray card can be a piece of paper or plastic of a particular shade of gray which, when placed within an image, can provide post-processing tools with information as to how to correct an image's white balance and colors. However, this approach requires that users purchase a gray card, and place the gray card in each image that is to be color-corrected. Again, this approach is not particularly practical or desirable for users that would like color-corrected images with minimal hassle or effort. As such, conventional approaches to color correction require more expertise, effort, pre-planning, and/or expense than many users are interested in applying to their digital images.

An improved approach rooted in computer technology overcomes the foregoing and other disadvantages associated with conventional approaches specifically arising in the realm of computer technology. In general, one or more objects in an image can be identified, and color correction can occur automatically based on the one or more objects identified in the image. In certain embodiments, object identification may be automated, for example, by using one or more machine learning models. In certain embodiments, object identification may be performed by a user, for example, by providing the user with tools to identify objects in an image. In order to determine how to perform color correction for an image, an identified object's captured color can be compared to its true color. True color information associated with identified objects can be stored and retrieved in order to perform the comparison. For example, true color information for various objects having consistent, fixed colors (e.g., known color objects) can be stored in a data store. Examples of known color objects may include products and/or objects having a fixed, known color scheme. When known color objects are detected in an image, captured color information from the image for the known color object can be compared to true color information associated with the known color object. The comparison can be used to calculate a color delta indicative of the difference between the captured color for the known color object and the true color of the known color object. The image can be modified based on the color delta. More details regarding the present disclosure are provided herein.

FIG. 1 illustrates an example system 100 including an example automated color correction module 102, according to an embodiment of the present disclosure. The automated color correction module 102 can be configured to automatically perform color correction for a digital image. In various embodiments, the automated color correction module 102 can be configured to identify one or more objects depicted in an image. For at least one of the objects identified, true color information can be obtained. True color information associated with the at least one identified object can be compared to captured color information associated with the at least one identified object. Based on the comparison of the true color information and the captured color information, a color delta indicative of a difference between the true color information for the identified object and the captured color information for the identified object. The digital image can be modified based on the color delta can be determined.

As shown in the example of FIG. 1, the automated color correction module 102 can include an image analysis module 104 and an image modification module 106. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details. In various embodiments, one or more of the functionalities described in connection with the automated color correction module 102 can be implemented in any suitable combinations.

In some embodiments, the automated color correction module 102 can be implemented, in part or in whole, as software, hardware, or any combination thereof. In general, a module, as discussed herein, can be associated with software, hardware, or any combination thereof. In some implementations, one or more functions, tasks, and/or operations of modules can be carried out or performed by software routines, software processes, hardware, and/or any combination thereof. In some cases, the automated color correction module 102 can be implemented, in part or in whole, as software running on one or more computing devices or systems, such as on a user or client computing device. For example, the automated color correction module 102, or at least a portion thereof, can be implemented as or within an application (e.g., app), a program, or an applet, etc., running on a user computing device or a client computing system, such as the user device 610 of FIG. 6. In another example, the automated color correction module 102, or at least a portion thereof, can be implemented using one or more computing devices or systems that include one or more servers, such as network servers or cloud servers. In some instances, the automated color correction module 102 can, in part or in whole, be implemented within or configured to operate in conjunction with a social networking system (or service), such as the social networking system 630 of FIG. 6. It should be understood that there can be many variations or other possibilities.

The automated color correction module 102 can be configured to communicate and/or operate with the at least one data store 110, as shown in the example system 100. The data store 110 can be configured to store and maintain various types of data. In some implementations, the data store 110 can store information associated with the social networking system (e.g., the social networking system 630 of FIG. 6). The information associated with the social networking system can include data about users, user identifiers, social connections, social interactions, profile information, demographic information, locations, geo-fenced areas, maps, places, events, pages, groups, posts, communications, content, feeds, account settings, privacy settings, a social graph, and various other types of data. In some embodiments, the data store 110 can store information that is utilized by the automated color correction module 102. For example, the data store 110 can store one or more object recognition machine learning models, true color information for a plurality of known color objects, image information, and the like. It is contemplated that there can be many variations or other possibilities.

The image analysis module 104 can be configured to obtain information about an image. For example, the image analysis module 104 can be configured to identify one or more objects depicted in an image. For at least a subset of the one or more objects depicted in an image, true color information and captured color information can be obtained. The image analysis module 104 is described in greater detail herein with reference to FIG. 2.

The image modification module 106 can be configured to modify an image based on image information (e.g., image information obtained by the image analysis module 104). In certain embodiments, the image modification module 106 can be configured to determine a color delta based on a comparison of true color information and captured color information for one or more objects depicted in an image. The image modification module 106 can be further configured to perform color correction for the image based on the color delta. The image modification module 106 is described in greater detail herein with reference to FIG. 3.

Figure 2:
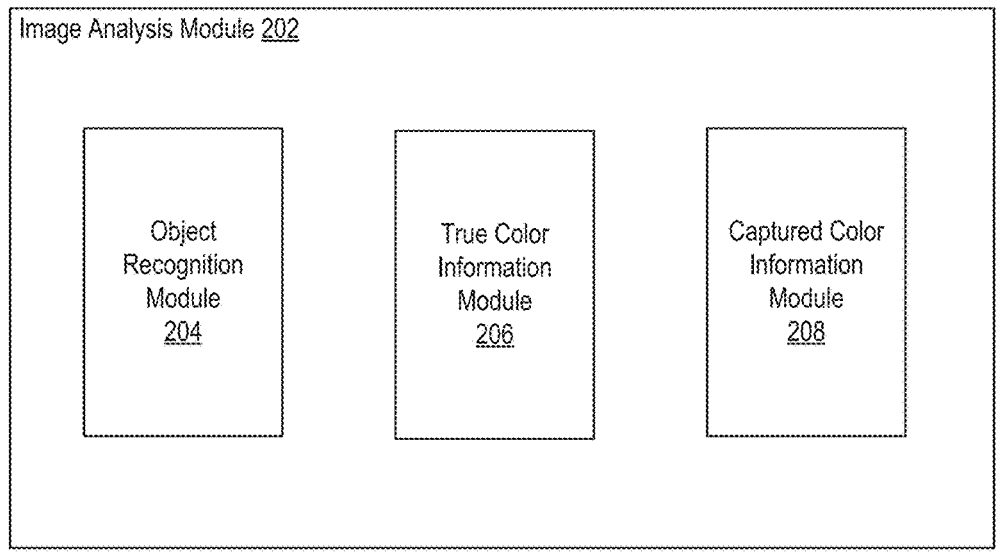
FIG. 2 illustrates an example image analysis module, according to various embodiments of the present disclosure.

FIG. 2 illustrates an example image analysis module 202 configured to analyze and obtain information about a digital image, according to an embodiment of the present disclosure. In some embodiments, the image analysis module 104 of FIG. 1 can be implemented as the image analysis module 202. As shown in the example of FIG. 2, the image analysis module 202 can include an object recognition module 204, a true color information module 206, and a captured color information module 208.

The object recognition module 204 can be configured to identify one or more objects depicted in an image. In certain embodiments, object recognition may be based on manual identification of objects by a user. For example, a user may be provided with an interface in which the user can select an object in an image, and identify the selected object as a particular object. For example, if an image includes a soda can made by Soda Brand A, the user can select the object, and identify it as a soda can made by Soda Brand A.

In certain embodiments, object recognition may be performed automatically. For example, object recognition can be performed by one or more machine learning models trained to identify objects depicted in an image. In various embodiments, object recognition may be a combination of automatic and manual identification of objects. For example, in the example of an image depicting a soda can made by Soda Brand A, automated object recognition (e.g., using one or more machine learning models), may be able to identify that an object is a soda can. User input may then be received to identify the particular brand of the soda can (e.g., the user can identify the soda can as a soda can made by Soda Brand A).

The true color information module 206 can be configured to obtain true color information for one or more known color objects identified in an image. The object recognition module 204, discussed above, can be configured to identify objects in an image. However, certain objects may not be useful for performing a color comparison. For example, certain objects may not have a set or fixed color that can be used or considered as a "true color" for those objects. One example of such an object is an apple. Apples depicted in an image may be identifiable, but different apples, even apples of the same variety, or even the same apple at different times and levels of ripeness, can have different colors. As such, apples do not have a "true color." Conversely, a soda can for a particular soda made by a particular brand, typically has a set, defined color associated with it. As such, a true color database can be maintained which stores true color information for a plurality of known color objects. When a known color object is identified in an image by the object recognition module 204, the true color information module 206 can be configured to obtain true color information associated with the known color object. In certain embodiments, the object recognition module 204 can be configured to identify only known color objects for which true color information is known. In other embodiments, the object recognition module 204 can be configured to identify objects including objects for which true color information is not known. In such embodiments, any identified objects for which true color information is not known can be disregarded for purposes of color correction. In certain embodiments, true color information can be stored as RGB values. As used herein, an "RGB value" is made up of three values: a red "R" value, a green "G" value, and a blue "B" value. Each individual color value (i.e., each R value, G value, and B value) can be a value between 0 and 255.

In certain embodiments, true color information for a known color object can comprise a plurality of RGB values. This may be the case if a known color object comprises a plurality of colors. For example, a can of Coca-Cola soda can include a particular shade of red and a particular shade of white. As such, true color information for the can of Coca-Cola soda can include a first RGB value defining the particular shade of red, and a second RGB value defining the particular shade of white.

In certain embodiments, true color information for a known color object can comprise a single RGB value that represents a combination of multiple colors associated with the known color object. For example, for the can of Coca-Cola soda, rather than maintaining two separate RGB values for the red portion and the white portion of the can, a combined, weighted average of the red RGB value and the white RGB value can be stored.

The captured color information module 208 can be configured to determine captured color information for known color objects identified in an image. In various embodiments, the object recognition module 204, in identifying that an object is depicted in an image, can associate a plurality of pixels of the image with the identified object. The captured color information module 208 can be configured to gather captured color information (e.g., RGB values) for the plurality of pixels associated with the identified object. The captured color information for the plurality of pixels can be combined into a single object captured color information value, and/or can remain as a distinct set of a plurality of pixel captured color information values.

Figure 3:
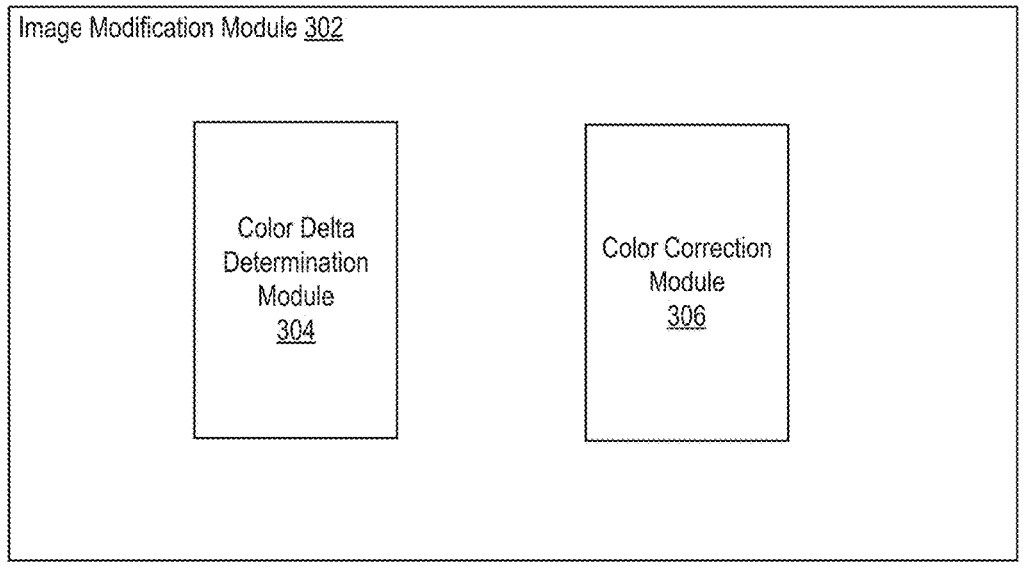
FIG. 3 illustrates an example image modification module, according to various embodiments of the present disclosure.

FIG. 3 illustrates an example image modification module 302 configured to modify an image based on one or more color deltas, according to an embodiment of the present disclosure. In some embodiments, the image modification module 106 of FIG. 1 can be implemented as the image modification module 302. As shown in the example of FIG. 3, the image modification module 302 can include a color delta determination module 304 and a color correction module 306.

The color delta determination module 304 can be configured to compare true color information for a known color object identified in an image with captured color information for the known color object. By comparing true color information and captured color information, a color delta can be calculated. For example, if a known color object is associated with a true color RGB value of [45R, 25G, 20B], and the known object is depicted in an image with a captured color RGB value of [40R, 10G, 30B], the color delta can be calculated as [+5R, +15G, -10B]. In this embodiment, the color delta represents how much each color value must be adjusted in order to modify an object's captured color to its true color.

Color delta may be calculated in a variety of ways. For example, in one embodiment, captured color information for each pixel in an image associated with a known color object can be compared to true color information associated with the pixel to yield a color delta for the pixel. In certain embodiments, these individual pixel color deltas can be aggregated (e.g., averaged) in order to determine an overall object color delta. In another embodiment, captured color information for each pixel associated with an identified object can be aggregated (e.g., averaged) to obtain captured color information for the object. In such an embodiment, the captured color information for the object can be a single RGB value representative of the captured color for the identified object. The object captured color information can then be compared to true color information in order to determine a color delta for the object.

As introduced above, in certain embodiments, known color objects may have multiple true colors. For example, a can of Coca-Cola soda can be associated with a particular shade of red and a particular shade of white. Multiple colors associated with a particular known color object can be taken into consideration in various ways. In certain embodiments, each individual true color value can be stored separately, such that a known color object can be associated with a plurality of true color values. In such embodiments, a determination can be made as to which true color RGB value associated with the known color object is the appropriate true color RGB value for a given comparison. For example, if a Coca-Cola can is identified in an image, it can be determined that each red pixel in the Coca-Cola can should be compared to the true color red RGB value, and that each white pixel in the Coca-Cola can should be compared to the true color white RGB value. The determination of which true color value is the appropriate one to use can be made based on which true color value is closer to the captured color value of a given pixel. As discussed above, a color delta can then be obtained by combining individual pixel color deltas into an overall object color delta. For example, color deltas for individual pixels can be averaged to obtain an overall object color delta.

In certain embodiments, rather than associating multiple true color RGB values with a known color object, a single true color RGB value can be associated with each known color object, even for those that have multiple colors. In certain embodiments, if a known color object has multiple colors, a single, dominant color can be selected as the true color value to be associated with the known color object. For example, a basketball may have both orange and black portions, but the orange true color RGB value can be selected to be associated with the basketball. In other embodiments, the true color value associated with an known color object may represent a weighted average of true color values for an object. For example, if a basketball is 95% orange, and 5% black, the orange RGB value and the black RGB value can be combined into a weighted average that is then associated as the true color value for the basketball. In such embodiments, a color delta can be determined by comparing a captured color value of an object that is a weighted average of captured color values for all pixels associated with the object with the single true color value associated with the object.

The color correction module 306 can be configured to modify an image based on a color delta determined by the color delta determination module 304. For example, consider a scenario in which a single known color object is identified in an image, and the color delta determination module 304 calculates a color delta of [+10R, -20G, +5B] for the depicted known color object. The color correction module 306 can apply a correction of [+10R, -20G, +5B] to each pixel of the known color object as well as each pixel of the entire image.

It may be the case that multiple known color objects can be identified in an image. In various embodiments, the color correction module 306 can be configured to modify an image based on multiple color deltas. In certain embodiments, color deltas for the multiple known color objects can be combined (e.g., averaged) to obtain an overall color delta that is applied to the entire image. In other embodiments, a first color delta calculated for a first known color object may be used to modify a first portion of an image, and a second color delta calculated for a second known color object may be used to modify a second portion of the image. For example, the first color delta can be used to modify a first portion of the image associated with and/or proximate to the first known color object, and the second color delta can be used to modify a second portion of the image associated with and/or proximate to the second known color object.

Figure 4A:
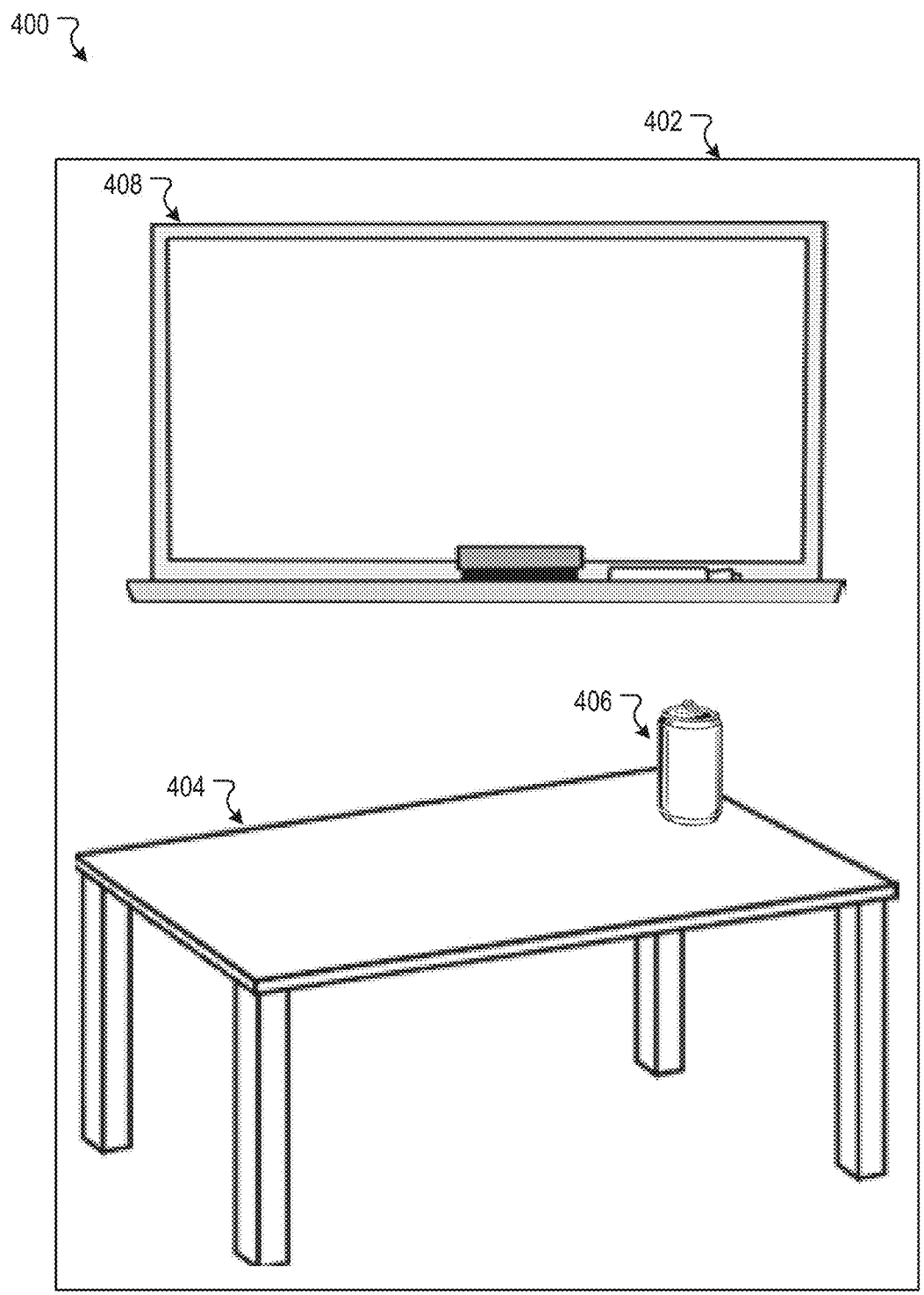
FIG. 4A illustrates an example scenario associated with automated color correction of a digital image, according to an embodiment of the present disclosure.

FIG. 4A illustrates an example scenario 400 associated with automated color correction of a digital image, according to an embodiment of the present disclosure. The example scenario 400 includes an image 402. The image 402 depicts a classroom including a desk 404, a can 406, and a whiteboard 408. In the example scenario 400, various objects can be identified, including the desk 404, the can 406, and the whiteboard 408. The can 406 can be identified as a known color object, i.e., an object that has associated true color information (e.g., a true color RGB value). A captured color RGB value for the can 406 can be compared to a true color RGB value associated with the can 406. True color information, such as true color RGB values, can be maintained in a data store of a system, such as a social networking system, implementing automated color correction in accordance with the present disclosure. Comparison of the captured color RGB value for the can 406 and the true color RGB value associated with the can 406 can result in a color delta. For example, the captured color RGB value for the can 406 can be determined to be [100R, 10B, 120G], while the true color RGB value for the can 406 is determined to be [50R, 50B, 50G]. The color delta can be calculated as [−50R, +40B, −70G]. The color delta can be applied to some or all pixels in the image 402.

Figure 4B:
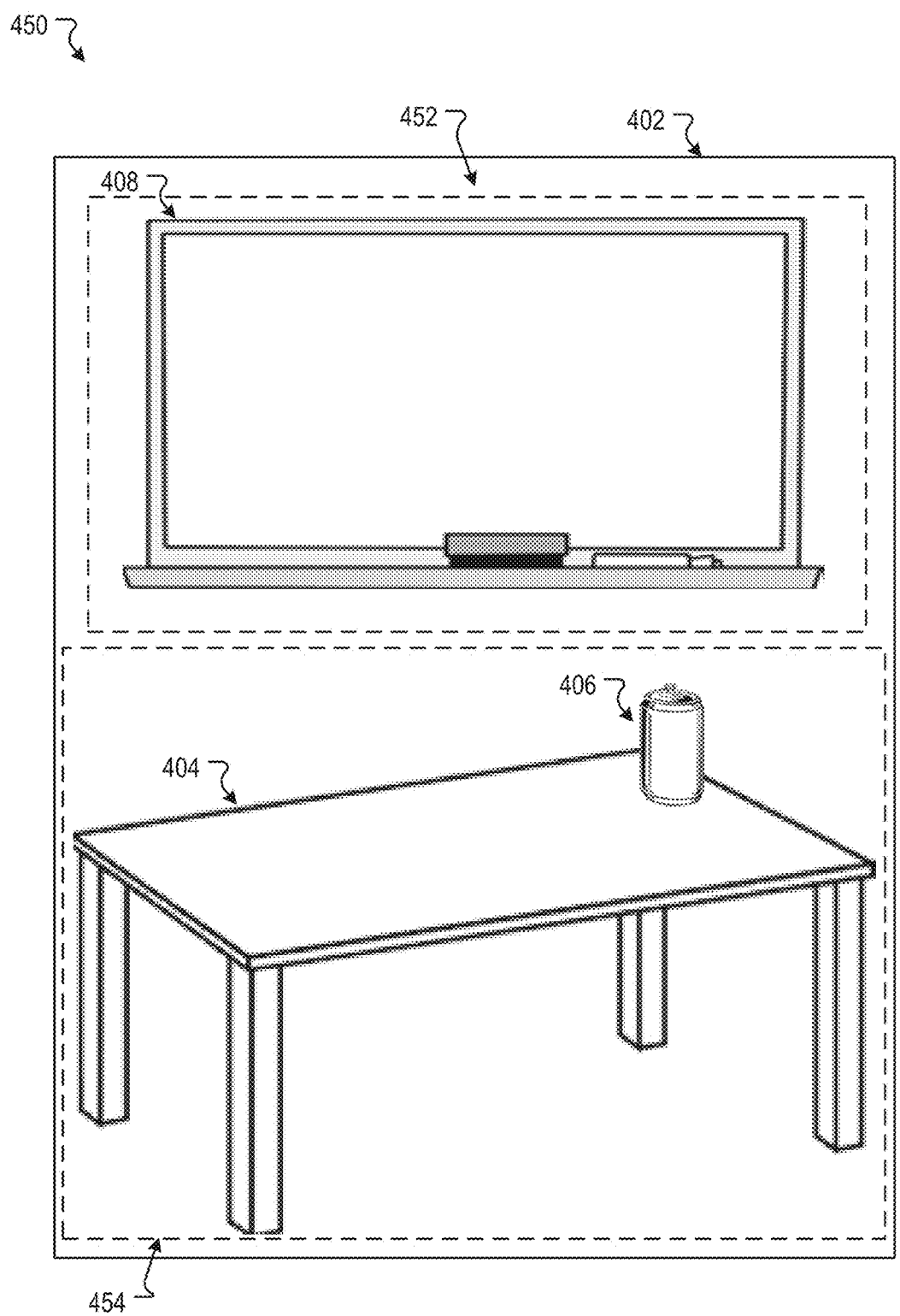
FIG. 4B illustrates an example scenario associated with automated color correction of a digital image based on multiple known color objects, according to an embodiment of the present disclosure.

FIG. 4B illustrates an example scenario 450 associated with automated color correction of a digital image based on multiple known color objects, according to an embodiment of the present disclosure. The example scenario 450 includes the same image 402 as FIG. 4A. The image 402 again depicts a classroom including a desk 404, a can 406, and a whiteboard 408. However, in the example scenario 450, both the can 406 and the whiteboard 408 are identified as known color objects. A captured color RGB value for the can 406 can be compared to a true color RGB value associated with the can 406. Similarly, a captured color RGB value for the white board 408 can be compared to a true color RGB value associated with the white board 408. Comparison of the captured color RGB value for the can 406 and the true color RGB value associated with the can 406 can result in a first color delta. Comparison of the captured RGB value for the white board 408 and the true color RGB value for the white board 408 can result in a second color delta. For example, the captured color RGB value for the can 406 can be determined to be [100R, 10B, 120G], while the true color RGB value for the can 406 is determined to be [50R, 50B, 50G]. Using this information, the first color delta can be calculated as [−50R, +40B, −70G]. The captured color RGB value for the white board 408 can be determined to be [150R, 125B, 250G] while the true color RGB value for the white board 408 is determined to be [250R, 250B, 250G]. Using this information, the second color delta can be calculated as [+100R, +125B, 0G].

In certain embodiments, the first and second color deltas can be combined (e.g., averaged), and the combined color delta can be applied to the entire image 402. In other embodiments, the first color delta can be applied to a first portion of the image 402 associated with the can 406, and the second color delta can be applied to a second portion of the image 402 associated with the white board 408. For example, in the example scenario 450, the first color delta can be applied to a first portion 452, and the second color delta can be applied to a second portion 454. While the example scenario 450 depicts two known color objects, it should be appreciated that a greater number of known color objects can be detected and utilized to modify an image.

Figure 5:
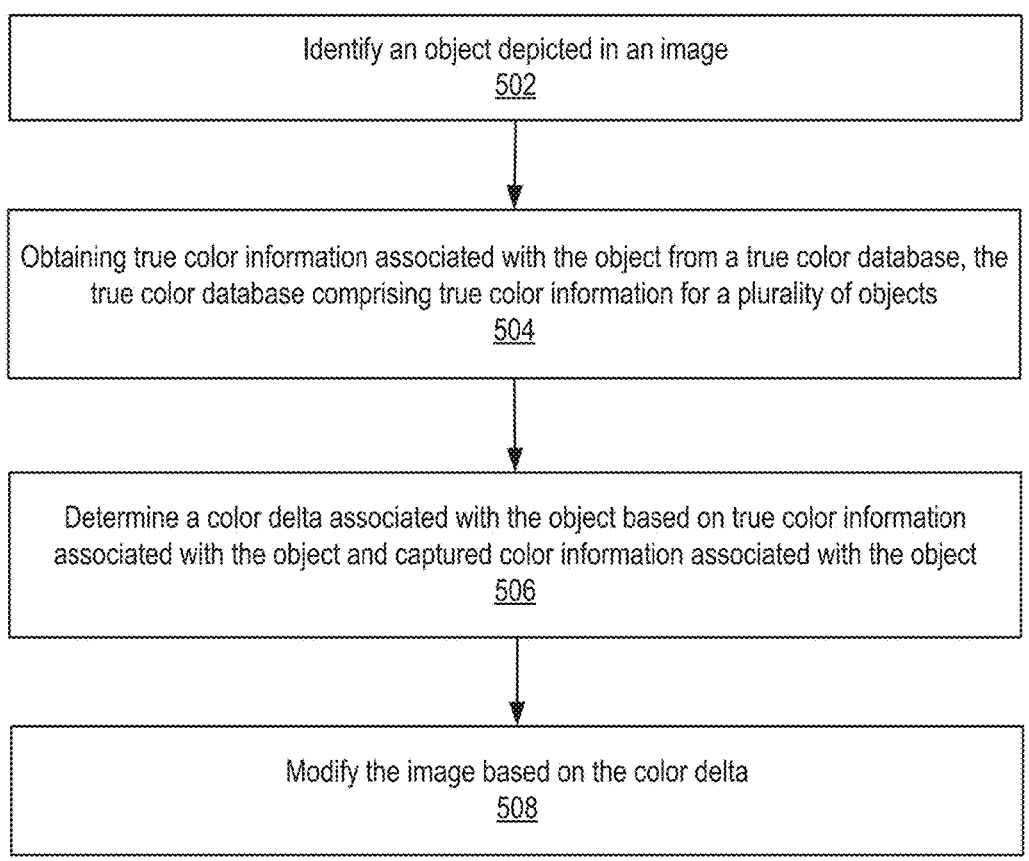
FIG. 5 illustrates an example method associated with automated color correction of a digital image, according to an embodiment of the present disclosure.

FIG. 5 illustrates an example method 500 associated with automated color correction of a digital image, according to an embodiment of the present disclosure. It should be appreciated that there can be additional, fewer, or alternative steps performed in similar or alternative orders, or in parallel, within the scope of the various embodiments discussed herein unless otherwise stated.

At block 502, the example method 500 can identify an object depicted in an image. At block 504, the example method 500 can obtain true color information associated with the object from a true color database, the true color database comprising true color information for a plurality of objects. At block 506, the example method 500 can determine a color delta associated with the object based on true color information associated with the object and captured color information associated with the object. At block 508, the example method 500 can modify the image based on the color delta.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
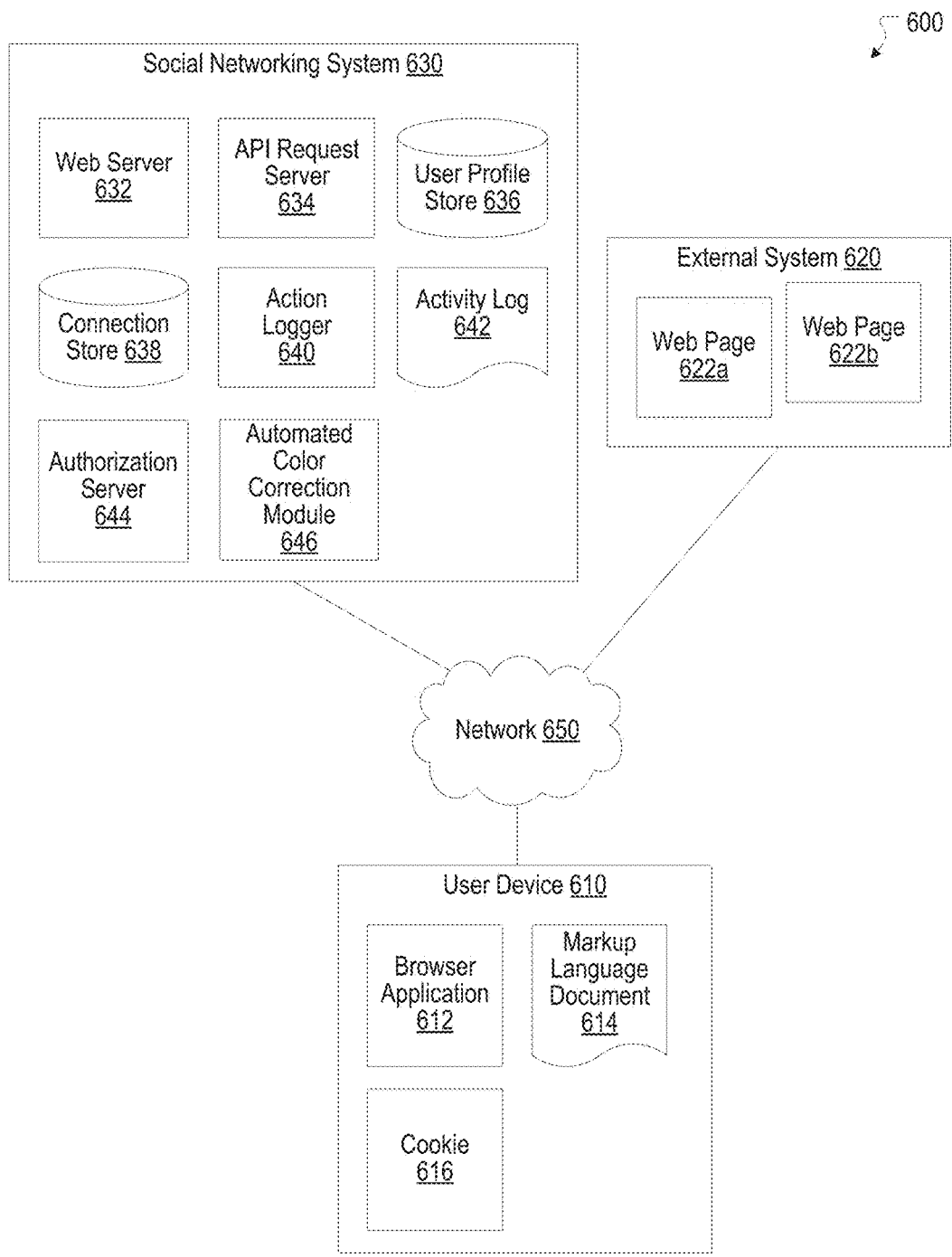
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, according to an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include an automated color correction module 646. The automated color correction module 646 can, for example, be implemented as the automated color correction module 102, as discussed in more detail herein. As discussed previously, it should be appreciated that there can be many variations or other possibilities. For example, in some embodiments, one or more functionalities of the automated color correction module 646 can be implemented in the user device 610.

Hardware Implementation

Figure 7:
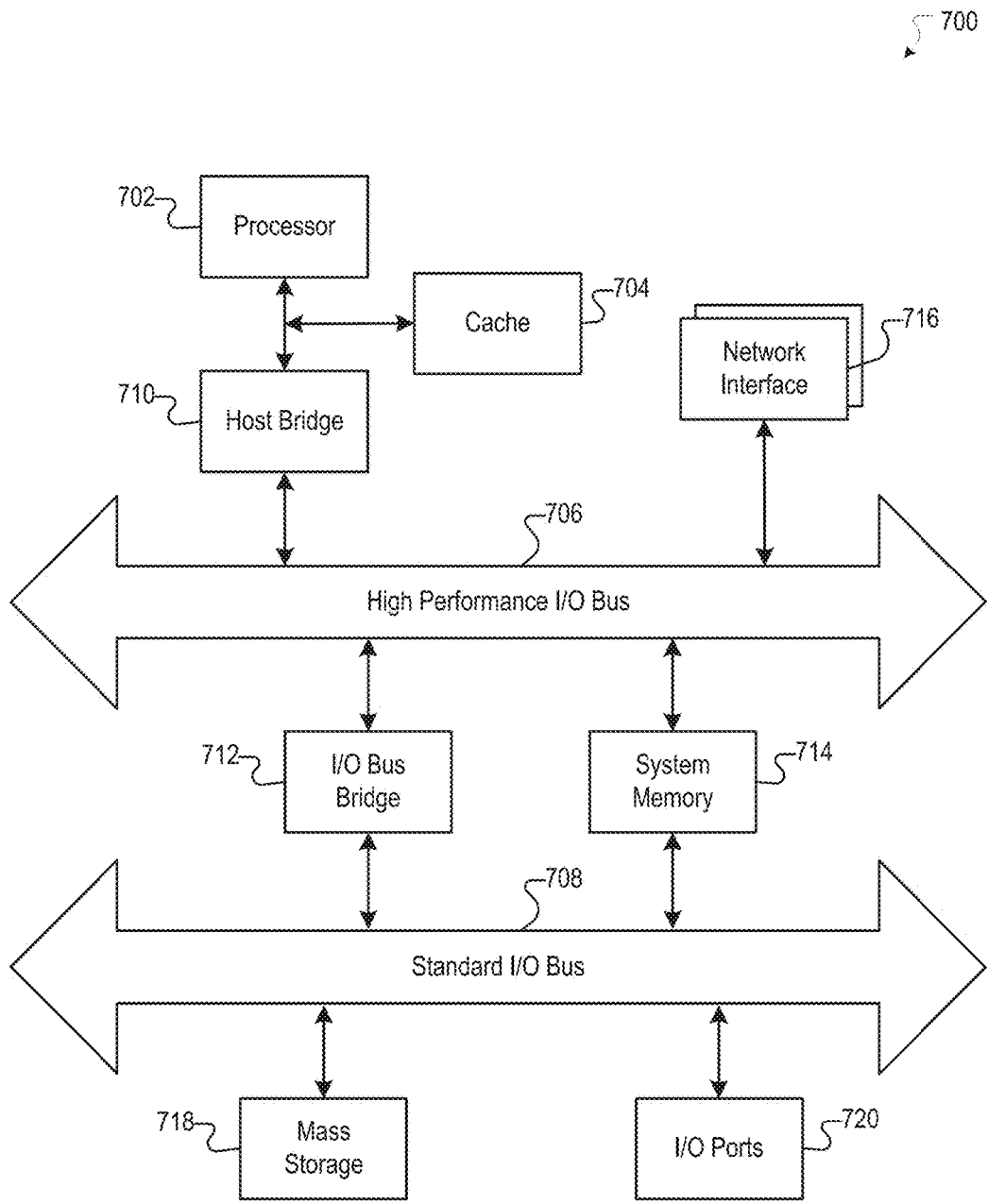
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   identifying, by a computing system, an object depicted in an image;
   obtaining, by the computing system, true color information associated with the object from a true color database, the true color database comprising true color information for a plurality of objects;
   determining, by the computing system, a color delta associated with the object based on the true color information and captured color information associated with the object; and
   modifying, by the computing system, the image based on the color delta.

2. The computer-implemented method of claim 1, wherein the identifying the object depicted in the image is performed automatically based on one or more machine learning models.

3. The computer-implemented method of claim 1, wherein
   the true color information comprises a true color RGB value, and
   the captured color information comprises a captured color RGB value.

4. The computer-implemented method of claim 3, wherein the color delta comprises a difference of the true color RGB value and the captured color RGB value.

5. The computer-implemented method of claim 4, wherein the modifying the image based on the color delta comprises applying the color delta to each pixel in the image.

6. The computer-implemented method of claim 3, wherein the true color information associated with the object comprises a plurality of RGB values, and
   further wherein the plurality of RGB values are indicative of the object containing a plurality of colors.

7. The computer-implemented method of claim 3, wherein the captured color information associated with the object comprises an average of a plurality of pixel RGB values for a plurality of pixels associated with the object.

8. The computer-implemented method of claim 1, wherein the identifying the object depicted in the image is performed based on user identification of one or more objects in the image.

9. The computer-implemented method of claim 1 further comprising:
   identifying a second object depicted in the image; and
   determining that the second object is not associated with true color information in the true color database.

10. The computer-implemented method of claim 1 further comprising:
    identifying a second object depicted in the image;
    obtaining true color information associated with the second object from the true color database; and
    calculating a second color delta associated with the second object based on the true color information associated with the second object and captured color information associated with the second object, wherein
       the modifying the image comprises modifying the image based on the color delta and the second color delta.

11. A system comprising:
at least one processor; and
a memory storing instructions that, when executed by the at least one processor, cause the system to perform a method comprising:
   identifying an object depicted in an image;
   obtaining true color information associated with the object from a true color database, the true color database comprising true color information for a plurality of objects;
   determining a color delta associated with the object based on the true color information and captured color information associated with the object; and
   modifying the image based on the color delta.

12. The system of claim 11, wherein the identifying the object depicted in the image is performed automatically based on one or more machine learning models.

13. The system of claim 11, wherein
the true color information comprises a true color RGB value, and
the captured color information comprises a captured color RGB value.

14. The system of claim 13, wherein the color delta comprises a difference of the true color RGB value and the captured color RGB value.

15. The system of claim 14, wherein the modifying the image based on the color delta comprises applying the color delta to each pixel in the image.

16. A non-transitory computer-readable storage medium including instructions that, when executed by at least one processor of a computing system, cause the computing system to perform a method comprising:
   identifying an object depicted in an image;
   obtaining true color information associated with the object from a true color database, the true color database comprising true color information for a plurality of objects;
   determining a color delta associated with the object based on the true color information and captured color information associated with the object; and
   modifying the image based on the color delta.

17. The non-transitory computer-readable storage medium of claim 16, wherein the identifying the object depicted in the image is performed automatically based on one or more machine learning models.

18. The non-transitory computer-readable storage medium of claim 16, wherein
the true color information comprises a true color RGB value, and
the captured color information comprises a captured color RGB value.

19. The non-transitory computer-readable storage medium of claim 18, wherein the color delta comprises a difference of the true color RGB value and the captured color RGB value.

20. The non-transitory computer-readable storage medium of claim 19, wherein the modifying the image based on the color delta comprises applying the color delta to each pixel in the image.

* * * * *